Figure 2:
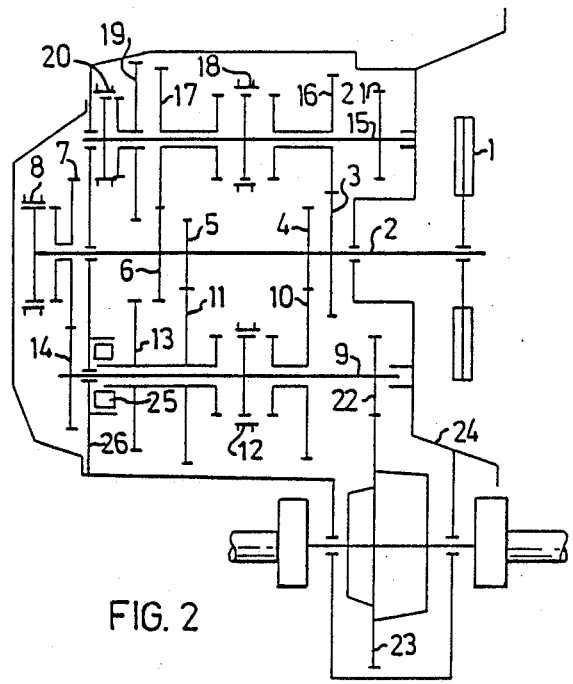

United States Patent [19]

Janiszewski

[11] Patent Number: 4,811,655

[45] Date of Patent: * Mar. 14, 1989

[54] MOTOR VEHICLE GEARBOX WITH ONE-WAY CLUTCH IN A SELECTED GEAR

[75] Inventor: Grzegorz Janiszewski, Angered, Sweden

[73] Assignee: AB Volvo, Gothenburg, Sweden

[*] Notice: The portion of the term of this patent subsequent to Jan. 24, 2006 has been disclaimed.

[21] Appl. No.: 22,526

[22] Filed: Mar. 9, 1987

[30] Foreign Application Priority Data

Mar. 17, 1986 [SE] Sweden .............................. 8601248

[51] Int. Cl.⁴ .............................................. F16H 3/10
[52] U.S. Cl. ............................................ 74/331; 192/7
[58] Field of Search ................. 74/331, 356, 357, 359; 192/3 H, 106.1, 41 A, 7; 188/82.8, 82.84

[56] References Cited

U.S. PATENT DOCUMENTS

| | | | |
|---|---|---|---|
| 2,888,116 | 5/1959 | Troendly et al. .................. | 192/45.1 |
| 4,106,358 | 8/1978 | Morrison ......................... | 74/359 X |
| 4,116,082 | 9/1978 | Kelbel ............................ | 74/359 X |
| 4,461,188 | 7/1984 | Fisher ............................ | 74/331 |
| 4,565,106 | 1/1986 | Sumiyoshi ....................... | 74/359 |
| 4,646,890 | 3/1987 | Yamada et al. .................. | 192/106.1 |

FOREIGN PATENT DOCUMENTS

| | | | |
|---|---|---|---|
| 514045 | 3/1921 | France .............................. | 188/82.8 |
| 55-22502 | 2/1980 | Japan .............................. | 192/3 H |

Primary Examiner—Leslie A. Braun
Assistant Examiner—Dwight G. Diehl
Attorney, Agent, or Firm—Young & Thompson

[57] ABSTRACT

Motor vehicle gearbox, comprising a housing with at least one input shaft and at least one intermediate shaft having a gear engaged with a gear on the output shaft. At least one gear of each pair of mutually engaging gears is releasable from its shaft. An over-running clutch is coupled between a releasable gear for a gear speed, preferably the releasable gear for the lowest gear speed, for driving forward and the housing and is arranged to prevent that gear from having substantial rotation in a direction opposite to the direction of rotation for driving forward. However, provision is made for a very limited rotation of that gear in that opposite direction. For this purpose, the over-running clutch has an outer ring, an inner ring fixed to the releasable gear for the gear speed in question for driving forward, and blocking members arranged between the rings which permit rotation of the inner ring only in the direction for driving forward. The outer ring has at least one projection with projects into a peripheral cavity in a sleeve element fixed to the housing; and the play of this projection in the cavity permits very limited rotation of the outer ring relative to the housing. The outer ring is spring-urged in the releasing direction of the over-running clutch.

4 Claims, 1 Drawing Sheet

MOTOR VEHICLE GEARBOX WITH ONE-WAY CLUTCH IN A SELECTED GEAR

The present invention relates to a motor vehicle gearbox comprising a housing with at least one input shaft and at least one intermediate shaft having a gear engaged with a gear on the input shaft, at least one gear of each pair of mutually engaging gears being releaseable from its shaft.

A conventional stepped gearbox with a usual disc clutch between the gearbox and the engine cannot, as is possible with an automatic planatory gearbox with a hydrodynamic torque converter mounted between the engine and the gearbox for regulating the engine speed, be used to prevent the automobile from rolling backwards when starting on an upward incline. In vehicles with manual transmissions, the handbrake is therefore normally used when starting on an incline. It is in this case important to carefully adjust the release of the handbrake to depressing the throttle and release of the clutch pedal to prevent the vehicle from initially rolling back down the incline. Many drivers consider this to be a very difficult maneuver and therefore "ride" the clutch when on an upward incline, i.e. instead of moving one's foot from the gas pedal to the brake pedal one accelerates the engine to somewhat over idle speed and depresses the clutch pedal so that the clutch slips just enough to hold the vehicle stationary. This driving technique results in heavy wear on the clutch discs and when practised often appreciably shortens the life of the clutch disc.

The purpose of the present invention is to achieve a gearbox of the type described by way of introduction, which in combination with a conventional disc clutch has the same capacity as an automatic transmission with torque converter to prevent the vehicle from rolling backwards when starting on an uphill incline, thus eliminating the need to use the handbrake.

This is achieved according to the invention by virtue of the fact that an over-running clutch is coupled between the releaseable gear for the lowest gear speed for driving forward and the housing and is arranged to prevent the gear from rotating in a direction opposite to the direction of rotation for driving forward but which still permits a very limited rotation of the gear in said opposite direction.

The invention achieves with simple and inexpensive means a solution which prevents the vehicle from rolling backwards when the lowest gear is selected. This means that the driver, when he has his foot on the brake pedal, can lift his foot from the brake pedal as soon as the lowest gear speed is selected without any risk that the vehicle will roll backwards.

By making the over-running clutch slightly rotatable instead of fixed in the housing, all types of synchronizing means can be used, which require a certain rotational freedom of the synchronized mass in both rotational directions when engaging the gear speed when the vehicle is stationary. The arrangement according to the invention thus eliminates the risk of jamming due to the engaging sleeve and the engaging teeth being in an unfavourable relative position.

Figure 1:
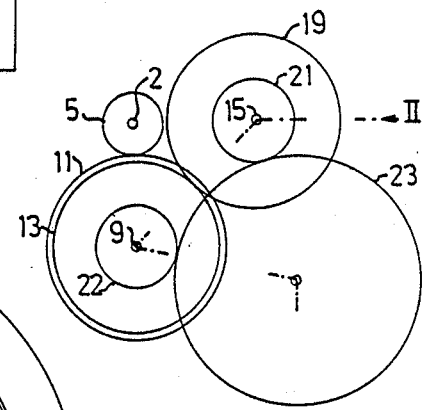
Figure 3:
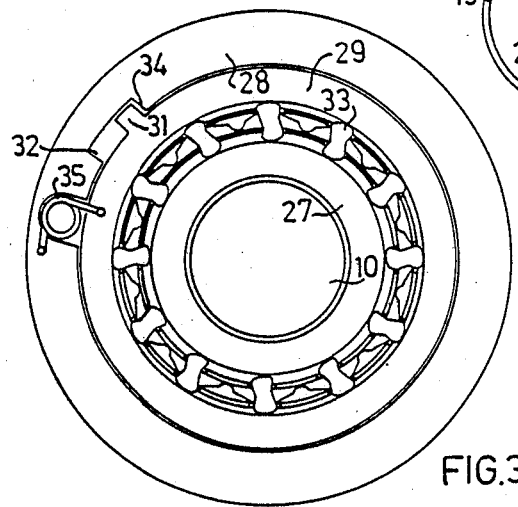

The invention will be described in more detail with reference to an example shown in the accompanying drawing, of which FIGS. 1 and 2 show schematically a five-speed manual gearbox and FIG. 3 shows an end view of an over-running clutch.

In FIG. 1, 1 designates a clutch disc of a clutch (not shown in more detail here). The clutch disc is non-rotatably mounted on an input shaft 2, which also has non-rotatably mounted gears 3, 4, 5 and 6 for 3rd, 2nd, 1st and 4th and a rotatably journalled intermediate gear 7 for 5th, which is lockable to the shaft by means of an engaging sleeve 8 with synchronizing means. On a first intermediate shaft 9, intermediate gears 10 and 11 are rotatably journalled and lockable to the shaft by means of an engaging sleeve 12 with synchronizing means. A gear 13 for reverse is fixed to the hub of intermediate gear 11 for 1st, and the gear 14 for 5th is non-rotatably mounted on the intermediate shaft 9. A second intermediate shaft 15 has rotatably journalled intermediate gears 16 and 17, which are lockable to the shaft by means of an engaging sleeve 18 with synchronizing means. A reverse intermediate gear 19 is lockable to the intermediate shaft 15 by means of an engaging sleeve 20 with synchronizing means. The intermediate shafts 9 and 15 have non-rotatably mounted gears 21,22, which engage with the crown wheel 23 of a differential, the housing of which is a portion of the gearbox housing itself 24.

According to the invention an over-running clutch 25 is coupled between the intermediate gear 11 for 1st on the intermediate shaft 9 and the gearbox housing 24. The over-running clutch 25, which is shown in more detail in FIG. 3, has an inner ring 27 solidly joined to the hub of intermediate gear 11 and an outer ring 29 which can be rotated slightly relative to the housing 24. This limited turning of the outer ring 29 is achieved by making said ring with a projection 31 which projects into a peripheral cavity 32 in a sleeve 28, which is securely mounted in an opening in the housing. Between the inner ring 27 and the outer ring 29, blocking members 33 are disposed, which permit rotation of the inner ring 27 relative to the outer ring 29 when transmitting torque from the input shaft to the intermediate gear 11 for the 1st gear speed, but which block rotation when torque is transmitted in the opposite direction from the drive wheels of the vehicle with the gear selector in 1st, via the crown wheel 23 ane the gear 22 to the intermediate shaft 9 and when the gear selector is in reverse, via the crown wheel 23, the gear 21, the intermediate shaft 15, the gear 19 and the gear 13. The over-running clutch 25 thus serves as an automatic aid, which "takes over" the function of the handbrake when starting on an incline in 1st or in reverse.

With the motor running and the gear selector in the neutral position, the frictional forces strive to turn the outer ring 29 of the over-running clutch to the position shown in FIG. 3, in which the projection 31 abuts against the end wall 34 of the cavity 32. To guarantee this, a spring 35 is coupled beteen the sleeve 28 and the outer ring 29. In this position, the outer ring can consequently be rotated a short distance in the normal blocking direction of the over-running clutch, i.e. counterclockwise in FIG. 3. This makes it possible to engage the gears without problems when the vehicle is standing still, regardless of the type of synchronizing means. In other words, the embodiment described permits the intermediate gear 13 for 1st to be rotated slightly in the blocking direction of the over-running clutch, if the engaging teeth of the engaging sleeve and the gear should happen to be in such a position that the peripheral forces between these components act in said direction.

The invention is of course not limited to a gearbox of the type described above. Rather it can be used in other types of gearboxes, i.e. in a gearbox of the type shown in Swedish Patent Application No. 8501541-0. There a gear which is rotatably mounted on but lockable to the hub of the intermediate gear for 1st engages the intermediate gear for 2nd on the other intermediate shaft. In this manner separate gears are eliminated for reverse. By applying the invention to such a gearbox, the advantage is achieved that the over-running clutch blocks against forward movement when the gear selector is in reverse, which facilitates backing up an incline.

It is of course also possible within the scope of the invention to achieve the limited rotatability of the outer ring of the over-running clutch in other ways than that described above.

I claim:

1. In a motor vehicle gearbox, comprising a housing with at least one input shaft and at least one intermediate shaft having gears engaging gears on the input shaft, at least one gear in each pair of interengaging gears being releasable from its shaft, an over-running clutch connected between only the releasable gear for the lowest forward gear speed and the housing, said over-running clutch blocking the releasable gear for the lowest forward gear speed against rotation in a direction opposite the rotational direction for driving forward, said releasable gear for the lowest forward gear speed having a speed of rotation lower than that of said input shaft; the improvement in which said over-running clutch still permits a limited rotation of said gear in said opposite direction.

2. Gearbox according to claim 1, characterized in that the over-running clutch has an outer ring, an inner ring fixed to the releasable gear for said gear speed for driving forward and blocking members arranged between the rings, which permit rotation of the inner ring only in the direction for driving forward, said outer ring having means cooperating with a portion fixed relative to the housing, which permit very limited rotation of the outer ring relative to the housing.

3. Gearbox according to claim 2, characterized in that the outer ring has at least one projection, which projects into a peripheral cavity in a sleeve element fixed to the housing.

4. Gearbox according to claim 3, characterized in that spring means urge the outer ring in the releasing direction of the over-running clutch.

* * * * *